United States Patent
Giraud et al.

(10) Patent No.: US 12,291,173 B2
(45) Date of Patent: May 6, 2025

(54) METHOD FOR CLEANING INSECT STRIKE OFF A GLAZED SURFACE OF A VEHICLE

(71) Applicant: Valeo Systèmes d'Essuyage, Le Mesnil Saint Denis (FR)

(72) Inventors: Frédéric Giraud, Le Mesnil Saint Denis (FR); Jean Luc Terrasse, Le Mesnil Saint Denis (FR); Alexandre Filloux, Le Mesnil Saint Denis (FR)

(73) Assignee: VALEO SYSTÈMES D'ESSUYAGE, Le Mesnil Saint Denis (FR)

( * ) Notice: Subject to any disclaimer, the term of this patent is extended or adjusted under 35 U.S.C. 154(b) by 153 days.

(21) Appl. No.: 17/823,667

(22) Filed: Aug. 31, 2022

(65) Prior Publication Data
US 2023/0065330 A1 Mar. 2, 2023

(30) Foreign Application Priority Data
Aug. 31, 2021 (FR) ...................................... 2109094

(51) Int. Cl.
*B60S 1/08* (2006.01)
*B60S 1/52* (2006.01)

(52) U.S. Cl.
CPC ............... *B60S 1/0818* (2013.01); *B60S 1/52* (2013.01)

(58) Field of Classification Search
None
See application file for complete search history.

(56) References Cited

U.S. PATENT DOCUMENTS

| 9,783,166 | B1 * | 10/2017 | Brown | B60S 1/481 |
| 2015/0353058 | A1 * | 12/2015 | Ernst | B60S 1/0862 |
| | | | | 15/250.01 |
| 2020/0094784 | A1 * | 3/2020 | Herman | B60S 1/0848 |
| 2022/0144218 | A1 * | 5/2022 | Bretagnol | B08B 13/00 |

FOREIGN PATENT DOCUMENTS

WO WO-2020136041 A1 * 7/2020 ............. B08B 13/00

* cited by examiner

*Primary Examiner* — Natasha N Campbell
*Assistant Examiner* — Pradhuman Parihar
(74) *Attorney, Agent, or Firm* — Osha Bergman Watanabe & Burton LLP

(57) ABSTRACT

A cleaning method (1) for cleaning a glazed surface (20) of a vehicle (2), said vehicle (2) comprising a cleaning device (21) comprising a wiping system (210) with at least one spray device for spraying a liquid (Lq), characterized in that said cleaning method (1) involves verifying (E1) a first condition (C1) that the current season (sc) is spring or summer, verifying (E2) a second condition (C2) which is the probability (pb) of there being insect strike (is) on said glazed surface (20), and verifying (E3) a third condition (C3) that said vehicle (2) is stopped. If all of the conditions (C) are met, then activating (E4) the cleaning device to begin a cleaning cycle (Cy), and executing (E5) the cleaning cycle (Cy) using said cleaning device (21).

12 Claims, 3 Drawing Sheets

[Fig. 1]
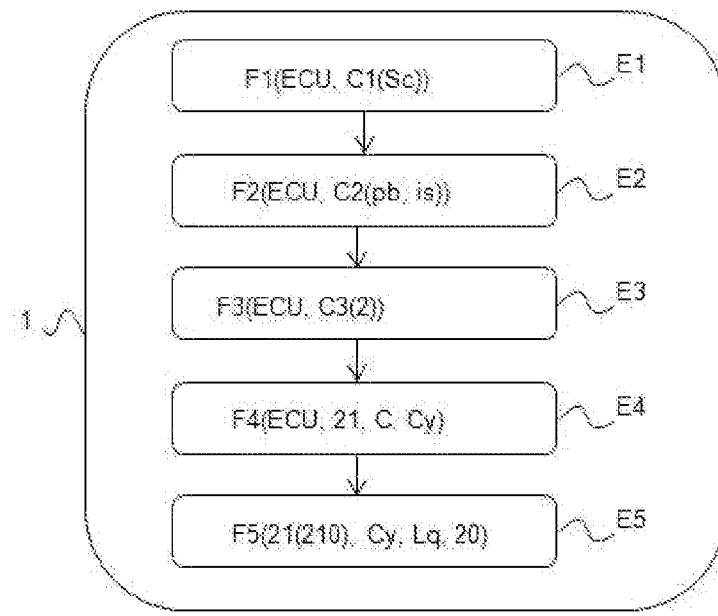
[Fig. 2]
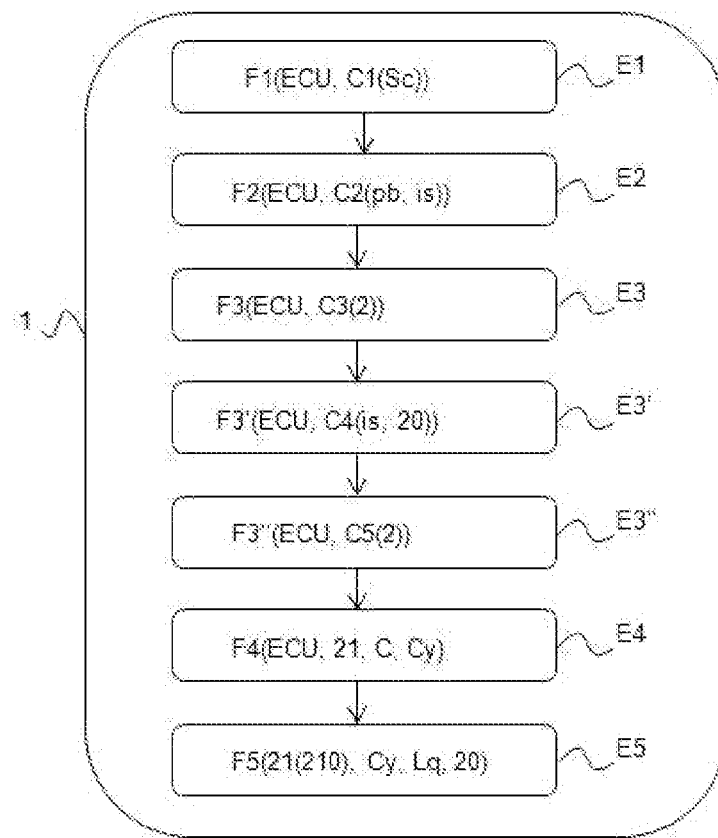

[Fig. 3]
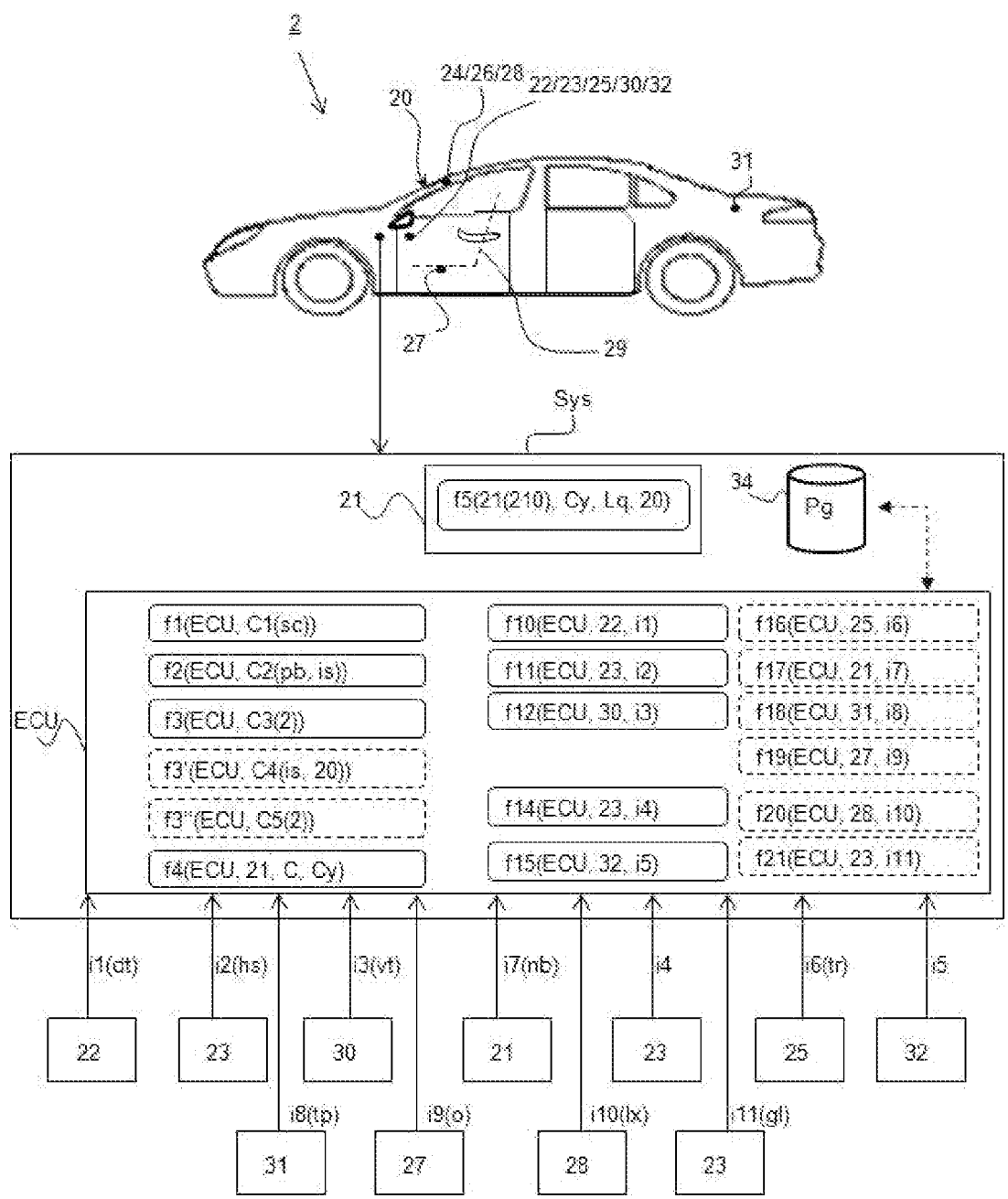

[Fig. 4]
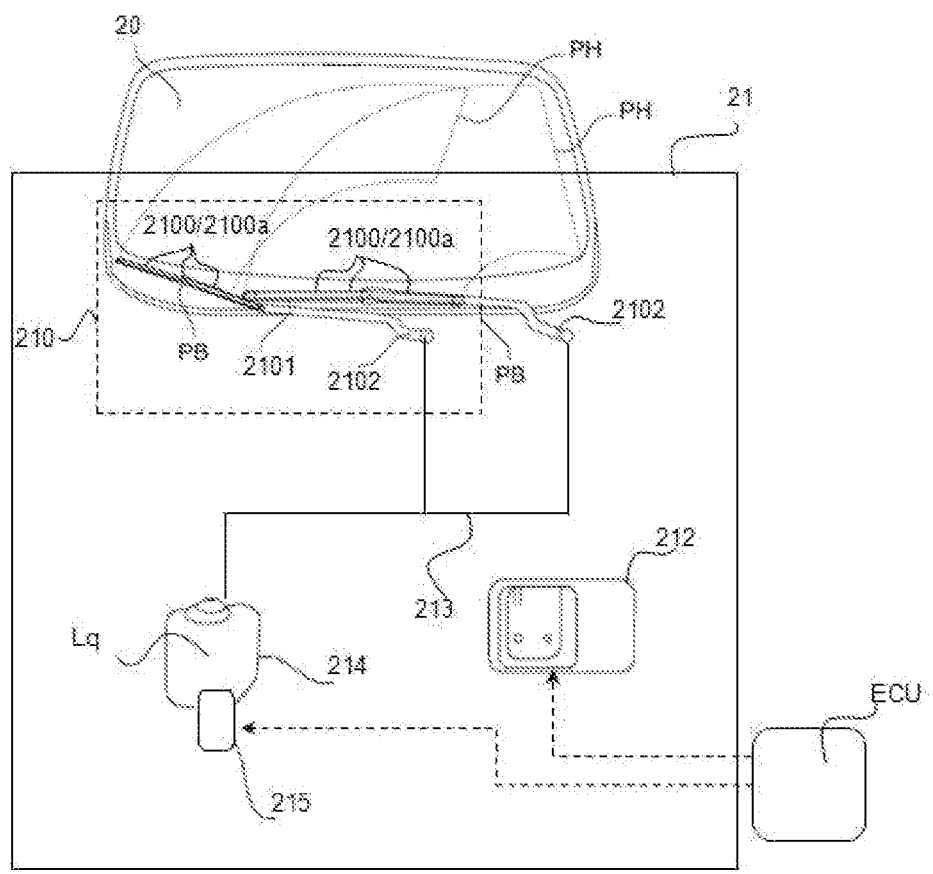

METHOD FOR CLEANING INSECT STRIKE OFF A GLAZED SURFACE OF A VEHICLE

The present invention relates to a method for cleaning a glazed surface of a vehicle. It is applied in particular, but without limitation, in motor vehicles.

A method for cleaning a glazed surface of a vehicle, said vehicle comprising the cleaning device, is known to those skilled in the art. The cleaning device comprises a wiping system with at least one device for spraying a liquid, which notably allows insect strike to be cleaned off the glazed surface of a windscreen of the vehicle.

One disadvantage with this state of the prior art is that said cleaning method entails human intervention because it is the user that manually initiates (remotely or otherwise) the cleaning method, on demand.

The present invention seeks to offer a method for cleaning a glazed surface of a vehicle that is automatic and autonomous and in which human intervention is no longer required.

To this end, the invention proposes cleaning a glazed surface of a vehicle, said vehicle comprising a cleaning device comprising a wiping system with at least one spray device for spraying a liquid, characterized in that said cleaning method comprises the steps of:
  verifying a first condition that the current season is spring or summer,
  verifying a second condition which is the probability of there being insect strike on said glazed surface,
  verifying a third condition that said vehicle is stopped,
  if all of said conditions are met, then activating said cleaning device in order to begin a cleaning cycle, and
  executing said cleaning cycle using said cleaning device.

By testing various conditions that make it possible to detect the presence of insect strike on the glazed surface, the method for cleaning a glazed surface of a vehicle according to the invention allows the cleaning of the glazed surface of the vehicle to be begun automatically when necessary, namely when there is insect strike on said glazed surface and if the latter is dirty. Moreover, because the cleaning is automatic, the glazed surface can be cleaned sufficiently early on, before the insect strike impairs the visibility for the driver, so that optimum use may thus be made of the cleaning fluid without consuming more than is needed.

According to nonlimiting embodiments, said method for cleaning a glazed surface of a vehicle can also comprise one or more additional characteristics taken alone or according to all the technically possible combinations, among the following.

According to one nonlimiting embodiment, the step of verifying the current season is performed using the current date and the hemisphere in which said vehicle is located.

According to one nonlimiting embodiment, the step of verifying the probability of there being insect strike on said glazed surface is based on a speed of said vehicle being above a primary threshold.

According to one nonlimiting embodiment, said primary threshold is equal to 70 km/h.

According to one nonlimiting embodiment, the step of verifying the probability of there being insect strike on said glazed surface is based on a geolocation of said vehicle being outside a built-up urban area.

According to one nonlimiting embodiment, said cleaning method further comprises an additional step of verifying a fourth condition that insect strike has dirtied said glazed surface such as to impair visibility for a driver of said vehicle.

According to one nonlimiting embodiment, the step of verifying that insect strike has dirtied said glazed surface is based on:
  a running time of said vehicle above a secondary threshold, or
  a number of insect strikes above a tertiary threshold.

According to one nonlimiting embodiment, said secondary threshold is equal to three hours.

According to one nonlimiting embodiment, said cleaning method further comprises an additional step of verifying a fifth condition that said vehicle is outdoors.

According to one nonlimiting embodiment, the tertiary threshold is equal to 15.

According to one nonlimiting embodiment, the liquid is a bug remover liquid.

According to one nonlimiting embodiment, the liquid is a screen-wash fluid or water.

According to one nonlimiting embodiment, the liquid is a heated screen-wash fluid or heated water.

According to one nonlimiting embodiment, said verification that said vehicle is outdoors is based on:
  information relating to a fuel filler flap being open, and
  information relating to the absence of anyone being in the driving seat.

According to one nonlimiting embodiment, the step of verifying that said vehicle is outdoors is performed using a rain-brightness sensor.

According to one nonlimiting embodiment, the step of verifying that said vehicle is outdoors is performed using a geolocation device.

According to one nonlimiting embodiment, the electronic control device is configured to:
  collaborate with the internal clock and receive information relating to the current date, and
  collaborate with the geolocation device and receive information relating to the hemisphere in which said motor vehicle is located.

According to one nonlimiting embodiment, the electronic control device is configured to:
  collaborate with the speedometer and receive information relating to the speed of the motor vehicle, or
  collaborate with a strike measurement device and receive information relating to the number of insect strikes on the glazed surface, or
  collaborate with the geolocation device and receive information indicating whether the motor vehicle is outside of a built-up urban area.

According to one nonlimiting embodiment, the electronic control device is configured to:
  collaborate with the running-time meter and receive information relating to the running time of said motor vehicle, or
  collaborate with a strike measurement device and receive information relating to the number of insect strikes on the glazed surface.

According to one nonlimiting embodiment, the electronic control device is configured to:
  collaborate with a motor vehicle fuel filler flap sensor and receive information that indicates that said fuel filler flap is open, and
  collaborate with the presence sensor and receive information relating to the absence of anyone in the driving seat.

According to one nonlimiting embodiment, the electronic control device is configured to:

collaborate with the rain-brightness sensor and receive information relating to the brightness outside the motor vehicle, and collaborate with the geolocation device and receive information indicating whether the geolocation is functional.

What is also proposed is a cleaning system for cleaning a glazed surface of a vehicle, said cleaning system comprising a cleaning device comprising a wiping system with at least one spray device for spraying a liquid onto a glazed surface of a vehicle, said cleaning device being configured to execute a cleaning cycle comprising spraying said liquid onto said glazed surface using said at least one spray device, characterized in that said cleaning system further comprises an electronic control unit configured to:

verify a first condition that the current season is spring or summer, verify a second condition which is the probability of there being insect strike on said glazed surface, verify a third condition that said vehicle is stopped, and if all of said conditions are met, then activate said cleaning device in order to begin a cleaning cycle.

The invention and its various applications will be better understood from reading the following description and examining the accompanying figures:

FIG. 1 is a flowchart of a method for cleaning a glazed surface of a vehicle, according to one nonlimiting embodiment of the invention;

FIG. 2 is a flowchart of the cleaning method of FIG. 1, said cleaning method comprising an additional step, according to one nonlimiting embodiment;

FIG. 3 is a schematic depiction of a cleaning system configured for implementing said cleaning method of FIGS. 1 and 2, according to one nonlimiting embodiment;

FIG. 4 is a schematic depiction of a cleaning device of the cleaning system of FIG. 3, according to one nonlimiting embodiment.

Elements that are identical, in structure or in function, and that appear in several figures use the same reference signs, unless specified otherwise.

The cleaning method 1 for cleaning a glazed surface 20 of a vehicle 2 according to the invention is described with reference to FIGS. 1 and 2 according to nonlimiting embodiments. In one non-limiting embodiment, the vehicle 2 is a motor vehicle. Motor vehicle means any type of motorized vehicle. This embodiment is taken as a nonlimiting example throughout the remainder of the description. Throughout the remainder of the description, the vehicle 2 is thus otherwise called motor vehicle 2. In one nonlimiting embodiment, the glazed surface 20 is the glazed surface of the windscreen of the vehicle 2.

The motor vehicle 2 is illustrated in FIG. 3.

As illustrated in FIG. 3, the motor vehicle 2 comprises a cleaning device 21 configured to clean the glazed surface 20 of the motor vehicle 2.

In nonlimiting embodiments, such as illustrated in FIG. 3, the motor vehicle 2 further comprises one or more of the following elements:

an internal clock 22,
a geolocation device 23,
an insect-strike measurement device 24,
a running-time meter 25,
an accelerometer 26,
at least one presence sensor 27 situated at the driving seat 29 of the motor vehicle 2,
a rain-brightness sensor 28. This sensor may be split into two sensors, one for rain and the other for brightness,
speedometer 30,
a fuel filler flap sensor 31,
a stop sensor 32.

For the sake of legibility, the elements 22, 23, 25, 30 and 32 have been grouped together in FIG. 3 and the elements 24, 26 and 28 have been grouped together in FIG. 3.

As illustrated in FIG. 4, the cleaning device 21 comprises:

a wiper system 210,
a drive motor 212,
a ducting system 213,
a tank 214 for storing a cleaning liquid Lq,
at least one pump 215.

The cleaning liquid Lq is otherwise referred to as liquid Lq.

As illustrated in FIG. 4, said wiper system 210 comprises:

at least one spray device 2100 having at least one orifice 2100a through which the liquid Lq can be sprayed onto the glazed surface 20,
at least one wiper blade 2101 (otherwise referred to as wiper), and
at least one drive arm 2102 (otherwise referred to as arm) connected to said at least one wiper blade 2101 via a connection device (not illustrated).

In one nonlimiting illustrated embodiment, the wiper system 210 comprises at least one drive arm 2102 which, connected to the wiper blade 2101, moves angularly back and forth past the glazed surface 20 between a low position PB and a high position PH. The drive arm 2102 is notably set up as a rod which extends along a longitudinal axis and one end of which is connected to the wiper blade 2101 by a connection device (not illustrated) and another end of which is connected to a means of driving the wiper blade 2101, such as the drive motor 212.

In nonlimiting embodiments, said at least one spray device 2100 is situated on the wiper blade 2101, or on the drive arm 2102, or on the arm/blade connection device, or else on the bonnet of the motor vehicle 2. It is possible to have a combination of these various embodiments. In one nonlimiting embodiment, the spray device 2100 comprises a plurality of orifices 2100a. Thus, in nonlimiting embodiments, the orifices 2100a are on the wiper blade 2101, or on the drive arm 2102, or on the arm/blade connection device, or else on the bonnet of the motor vehicle 2. The orifices 2100a may be positioned in such a way as to spray liquid Lq towards the top of the wiper blades 2101, which is to say towards the top of the glazed surface 20, or they may be positioned in such a way as to spray liquid Lq towards the bottom of the wiper blades 2101, which is to say towards the bottom of the glazed surface 20.

In one nonlimiting embodiment, each wiper blade 2101 comprises at least one hydraulic lineset (also referred to as lineset) having orifices 2100a through which the liquid Lq can be sprayed onto/spread over the glazed surface 20. The hydraulic lineset thus forms the spray device 2100. In one nonlimiting embodiment variant, each wiper blade 2101 comprises two linesets, one of the linesets having orifices 2100a configured to spray the liquid Lq towards the top of the glazed surface 20, the other lineset having orifices 2100a configured to spray the liquid Lq towards the bottom of the glazed surface 20. These linesets may spray the liquid Lq simultaneously or alternately according to the direction of travel of the wiper blade 2101. The or each lineset of a wiper blade 2101 is supplied with liquid Lq by the ducting system 213.

The drive motor 212 is configured to drive the wiper blade or blades 2101, via the drive arms 2102, between their respective low positions PB and high positions PH.

The ducting system 213 connects the storage tank 214 to the orifices 2100a of said at least one spray device 2100.

In a first nonlimiting embodiment, the tank 214 is the screen-wash fluid tank. In a second nonlimiting embodiment, the tank 214 is a tank independent of the screen-wash fluid tank, each tank being associated with a different pump. In a third nonlimiting embodiment, the tank 214 may be partitioned and comprise two respective storage compartments, one for the liquid Lq and one for the screen-wash fluid, each compartment being associated with a different pump.

Said at least one pump 215 is associated with the tank 214 containing the liquid Lq and is configured to circulate the liquid Lq in the ducting system 213 until it is ejected by the orifice(s) 2100a of said at least one spray device 2100 onto the glazed surface 20, namely the glazed surface 20 of the windscreen in the nonlimiting example considered.

For applying the liquid Lq to the glazed surface 20 of the vehicle 2, the cleaning method 1 is described hereinafter with reference to FIGS. 1 and 2 according to one nonlimiting embodiment. The cleaning method 1 is implemented by a cleaning system Sys which comprises the cleaning device 21 described hereinabove and an electronic control unit ECU.

The electronic control unit ECU is configured to verify the following conditions C:
- whether the current season sc is spring or summer,
- the probability pb of there being insect strike on said glazed surface 20,
- whether said vehicle 2 is stopped.

In one nonlimiting embodiment, the electronic control unit ECU is further configured to verify the following additional condition C:
- whether the insect strike has dirtied said glazed surface 20.

In one nonlimiting embodiment, the electronic control unit ECU is further configured to verify a following additional condition C:
- whether the motor vehicle 2 is outside and not in an underground car park or in a garage, Thus, in a step E1 illustrated in FIG. 1 or 2 F1(ECU, C1(sc)), the electronic control unit ECU verifies the primary condition C1 that the current season sc is spring or summer.

In one nonlimiting embodiment, the electronic control unit ECU verifies the current season by means of the current date dt and of the hemisphere hs in which said motor vehicle 2 is located. In one nonlimiting example, the current-date information is given to the electronic control unit ECU by the internal clock 22 of the motor vehicle 2. In one nonlimiting example, the hemisphere (Southern or Northern) information is given to the electronic control unit ECU by the geolocation device 23. Using these two pieces of information it is possible to determine whether the season sc is spring or summer. In these two seasons, there are a great many insects around, and therefore there is a great risk of having insect strike on the glazed surface 20, and of this dirtying this surface and thus being able to impede the visibility for the driver.

In a step E2 illustrated in FIG. 1 or 2 F2(ECU, C2(pb, is)), the electronic control unit ECU verifies the secondary condition C2, which is the probability pb of there being insect strike is on the glazed surface 20.

In a first nonlimiting embodiment, the verification of said probability pb is based on a speed vt of said motor vehicle 2 being above a primary threshold. In one nonlimiting embodiment, the primary threshold is equal to 70 km/h (kilometres/hour). When the motor vehicle 2 is travelling at over 70 km/h, that means that the motor vehicle 2 is on a relatively high speed route. Upwards of this speed vt, insects may be squashed against the windscreen. The speed information is given to the electronic control unit ECU by the speedometer 30 of the motor vehicle 2. When travelling at high speed, there is a greater risk of the insects being squashed onto the glazed surface 20 and therefore of having insect strike is that dirties said surface and can thus impede the visibility for the driver.

In a second nonlimiting embodiment, the verification of said probability pb is based on a geolocation gl of said motor vehicle 2 being outside of a built-up urban area. The geolocation information gl is given to the electronic control unit ECU by the geolocation device 23. Outside of built-up urban areas, for example out in the countryside, there are more insects around than there are in the towns, and therefore a greater risk of having insect strike is on the glazed surface 20, and of this dirtying said surface and thus being able to impede the visibility for the driver.

In a step E3 illustrated in FIG. 1 or 2 F3(ECU, C3(2)), the electronic control unit ECU verifies a third condition C3 that said motor vehicle 2 is stopped.

Thus, the motor vehicle 2 must be stopped in order to begin the cleaning cycle Cy, because if not, if the cycle were begun while the motor vehicle 2 were being driven, it would surprise and inconvenience the driver of said motor vehicle 2. There would then be a risk to the safety of all the passengers of the motor vehicle 2.

It will be noted that steps E1 to E3 can be performed simultaneously or sequentially in any order whatsoever, or that some can be performed simultaneously and others sequentially in any order whatsoever.

In one nonlimiting embodiment illustrated in FIG. 2, the cleaning method 1 further comprises an additional step E3' illustrated as F3'(ECU, C4(is, 20)), in which the electronic control unit ECU verifies a fourth condition C4 that the insect strike is has dirtied the glazed surface 20 such that driver visibility is becoming awkward.

In a first nonlimiting embodiment, the verification of the dirtying of the glazed surface 20 by the insect strike is is based on a running time tr of said motor vehicle 2 being above a secondary threshold. In one nonlimiting embodiment, the secondary threshold is substantially equal to three hours. It is estimated that this time of three hours represents the amount of time it takes for the dirtying of the glazed surface 20 to make driver visibility awkward. The running-time information tr is given to the electronic control unit ECU by the running-time meter 25.

Thus, for example, if the vehicle has run at over 70 km/h for over three hours, visibility is becoming awkward on account of insect strike is. If this first embodiment is combined with the first nonlimiting embodiment at step E2 (speed vt over 70 km/h), in one nonlimiting embodiment the three-hour running time tr can be continuous or discontinuous running. Thus, when the running time tr is discontinuous, the running-time meter 25 is configured to trip the first time the speed vt of the motor vehicle 2 exceeds 70 km/h, and is not reset if the speed drops back below that. It continues to increment when the speed vt drops back above 70 km/h.

In a second nonlimiting embodiment, the verification of the dirtying of the glazed surface 20 by the insect strike is is based on a number nb of insect strikes is on the glazed surface 20 being above a tertiary threshold. In one nonlimiting embodiment, the tertiary threshold is equal to 15. Thus, upwards of 15 insect strikes, the dirt on the glazed surface 20 starts to make driver visibility awkward. The information on the number nb of insect strikes is is given to the electronic control unit ECU by the insect-strike measurement device 24. In one nonlimiting embodiment, the insect-strike measurement device 24 is an accelerometer bonded to the glazed surface 20 or an accelerometer bonded to the wiper blade 2101 or to a drive arm 2102.

In one nonlimiting embodiment illustrated in FIG. 2, the cleaning method 1 further comprises an additional step E3" illustrated as F3"(ECU, C5(2)), in which the electronic control unit ECU verifies a fifth condition C5 that said motor vehicle 2 is outside.

This fifth condition C5 avoids beginning a cleaning cycle Cy when the motor vehicle 2 is in a garage or underground car park. That avoids the liquid Lq spreading over the floor of the garage or of the underground car park and dirtying the floor.

In a first nonlimiting embodiment, the information relating to the motor vehicle 2 being outdoors is based on:
  information relating to the fuel filler flap being open, and
  information relating to the absence of anyone o being in the driving seat 29.

If those two conditions are met, then that indicates that the motor vehicle 2 is stopped and out in the open air because somebody is in the process of re-fuelling said motor vehicle 2.

The information tp relating to the fuel filler flap being open is given to the electronic control unit ECU by the fuel filler flap sensor 31. The information relating to the absence of anyone o being in the driving seat 29 is given to the electronic control unit ECU by the presence sensor 27. The latter sensor makes it possible to detect whether or not anyone o is sitting in the driving seat 29, and therefore whether or not the driving seat 29 is occupied.

In a second nonlimiting embodiment, the information relating to the motor vehicle 2 being outside is given to the electronic control unit ECU in the form of brightness information lx from the rain-brightness sensor 28, in combination with information to determine whether the geolocation gl of the motor vehicle 2 is functional. The brightness lx is otherwise known as illuminance or lighting.

It will be noted that this rain-brightness sensor 28 is commonly present on a motor vehicle 2. It is used, in nonlimiting examples, to perform a function of automatically switching on the lights when the daylight is dimming or when the motor vehicle 2 enters a tunnel, and to perform a function of automatically switching on the wipers in the event of rain.

If the brightness lx is above or equal to a brightness threshold, that means that the motor vehicle 2 is out in the open air and that it is not night-time or that it is in an underground car park with lighting or a garage with lighting. If the brightness lx is below the brightness threshold, that means that the motor vehicle 2 is out in the open air and that it is night-time or that it is in an unlit underground car park or a garage without lighting. In one nonlimiting example, the brightness threshold is comprised between 5 lux and 120,000 lux. In one nonlimiting example, the lighting in the car parks is in a range comprised between 5 lux and 20 lux. In one nonlimiting example, the lighting from a cloudy and stormy sky up to the point of being fully overcast is in a range comprised between 5 lux and 40 lux. In one nonlimiting example, the lighting from a cloudy sky is in a range comprised between 200 lux and 20,000 lux. In one nonlimiting example, the lighting at sunset or at sunrise is substantially equal to 400 lux. In one nonlimiting example, the lighting from a blue sky is in a range comprised between 10,000 and 25,000 lux. In one nonlimiting example, the lighting from direct sunlight with the sun at its zenith is substantially equal to 120,000 lux.

Thus, in a first nonlimiting embodiment variant, in order to verify for certain that the motor vehicle 2 is in a garage or in an underground car park, the rain-brightness sensor 28 is used in combination with the geolocation device 23 that provides the geolocation of the motor vehicle 2.

If the brightness lx is above or equal to the brightness threshold and if the geolocation gl of the motor vehicle 2 from the geolocation device 23 is functional, that means that the motor vehicle 2 is in the open air. It is not in an underground car park or in a garage with lighting. The cleaning cycle Cy can therefore be begun.

If the brightness lx is above or equal to the brightness threshold and if the geolocation gl of the motor vehicle 2 from the geolocation device 23 is not functional, that means that the motor vehicle 2 is not in the open air but is in an underground car park or in a garage with lighting. The cleaning cycle Cy is therefore not begun.

If the brightness lx is below the brightness threshold and if the geolocation gl of the motor vehicle 2 from the geolocation device 23 is functional, that means that the motor vehicle 2 is in the open air and that it is night time. It is not in an underground car park or in a garage with lighting. The cleaning cycle Cy can therefore be begun.

If the brightness lx is below the brightness threshold and if the geolocation gl of the motor vehicle 2 from the geolocation device 23 is not functional, that means that the motor vehicle 2 is not in the open air but is in an underground car park without lighting or in a garage without lighting. The cleaning cycle Cy is therefore not begun.

In a step E4 illustrated in FIG. 1 or 2 F4(ECU, 21, C, Cy), if all of the conditions C are met, then the electronic control unit ECU activates said cleaning device 21 to begin a cleaning cycle Cy. What is meant by activation is that the electronic control unit ECU sends a command to the cleaning device 21 to operate the pump 215 and to operate the drive motor 212.

Thus, in order to begin the cleaning cycle Cy it is necessary for:
  the current season sc to be spring or summer, and
  there to be a probability of there being insect strike is on the glazed surface, and
  the motor vehicle 2 to be stopped.

In instances in which the fourth condition C4 is also met, it is necessary for:—the insect strike is to have dirtied the glazed surface 20 such that the visibility for the driver is impaired.

In instances in which the fifth condition C5 is also met, it is necessary for:
  the current season sc to be spring or summer, and
  there to be a probability of there being insect strike is on said glazed surface, and
  the insect strike is to have dirtied the glazed surface such that the visibility for the driver is impaired, and
  the motor vehicle 2 to be stopped, and
  the motor vehicle 2 to be outside.

Activation of the cleaning device 21 involves:
  activating the drive motor 212 which drives the wiper arm 2101 and one of the wiper system 210,
  activating the pump 215 which circulates the liquid Lq in the ducting system 213 until it is ejected via the orifice or orifices 2100a of the spray device or devices 2100 onto the glazed surface 20.

In a step E5 illustrated in FIG. 1 and FIG. 2 F5(21(210), Cy, Lq, 20), the cleaning cycle Cy is thus executed. It is executed by the cleaning device 21. The cleaning cycle Cy includes spraying said liquid Lq onto said glazed surface 20 using said at least one spray device 2100.

In one nonlimiting embodiment, the liquid Lq is a bug remover liquid.

In some nonlimiting embodiments, the liquid Lq is a screen-wash fluid or water.

In some nonlimiting embodiments, the liquid Lq is a heated screen-wash fluid or heated water.

Thus, by virtue of the test on the conditions C1 to C3 and, where appropriate, C4 and/or C5, a cleaning of the glazed surface 20 of the motor vehicle 2 can be begun, namely executed, and be so automatically and autonomously without any individual person having to intervene.

Thus, the cleaning method 1 is implemented by a cleaning system Sys for cleaning a glazed surface 20 of a vehicle 2. The cleaning system Sys is illustrated in FIG. 3.

The cleaning system Sys comprises:
said cleaning device 21 comprising the wiping system 210 with at least one spray device 2100, said cleaning device 21 being configured to execute a cleaning cycle Cy, said cleaning cycle Cy comprising spraying said liquid Lq onto said glazed surface 20 using said at least one spray device 2100 (the function illustrated as f5(21(210), Cy, Lq, 20)), and said electronic control unit ECU.

The functions of the electronic control unit ECU are illustrated in FIG. 3.

The electronic control unit ECU is configured to:
verify a first condition C1 that the current season sc is spring or summer, (the function illustrated as f1(ECU, C1(sc))), verify a second condition C2 which is the probability pb of there being insect strike is on said glazed surface 20, (the function illustrated as f2(ECU, C2(pb, is))), verify a third condition C3 that said vehicle 2 is stopped, (the function illustrated as f3(ECU, C3(2))).

To this end, in order to perform the function f1, the electronic control unit ECU is configured to:
collaborate with the internal clock 22 and receive information i1 relating to the current date dt, (the function illustrated as f10(ECU, 22, i1)), and collaborate with the geolocation device 23 and receive information i2 relating to the hemisphere hs in which said motor vehicle is located (the function illustrated as f11(ECU, 23, i2)).

To this end, in order to perform the function f2, the electronic control unit ECU is configured to:
collaborate with the speedometer 30 and receive information i3 relating to the speed vt of the motor vehicle 2 (the function illustrated as f12(ECU, 30, i3)), or collaborate with the geolocation device 23 and receive information i4 indicating whether the motor vehicle 2 is outside of a built-up urban area (the function illustrated as f14(ECU, 23, i4)).

To this end, in order to perform the function f3, the electronic control unit ECU is configured to:
collaborate with at least one stop sensor 32 and receive information i5 relating to the stop of said motor vehicle 2 (the function illustrated as f15(ECU, 32, i5)).

In one nonlimiting embodiment, the electronic control unit ECU is further configured to verify a fourth condition C4 that impact strikes is have dirtied said glazed surface 20 (the function illustrated as f3'(ECU, C4(is, 20))). Because this function is optional, it is illustrated in dotted line in FIG. 3.

To this end, in order to perform the function f3', the electronic control unit ECU is configured to:

collaborate with the running-time meter 25 and receive information i6 relating to the running time tr of said motor vehicle 2 (the function illustrated as f16(ECU, 25, i6)), or collaborate with the strike measurement device 21 and receive information i7 relating to the number nb of insect strikes is on the glazed surface 20 (the function illustrated as f17(ECU, 21, i7)).

In one nonlimiting embodiment, the electronic control unit ECU is further configured to verify a fifth condition C5 that said motor vehicle 2 is outside (the function illustrated as f3"ECU, C5(2))). Because this function is optional, it is illustrated in dotted line in FIG. 3.

To this end, in order to perform the function f3", in a first nonlimiting embodiment variant, the electronic control unit ECU is configured to:
collaborate with a motor vehicle 2 fuel filler flap sensor 31 and receive information i8 that indicates that said fuel filler flap tp is open, (the function illustrated as f18 (ECU, 31, i8)), and collaborate with the presence sensor 27 and receive information i9 relating to the absence of anyone o in the driving seat 29 (the function illustrated as f19(ECU, 27, i9)).

To this end, in order to perform the function f3", in a second nonlimiting embodiment variant, the electronic control unit ECU is configured to:
collaborate with the rain-brightness sensor 28 and receive information i10 relating to the brightness lx outside the motor vehicle 2 (the function illustrated as f20(ECU, 28, i10)), and collaborate with the geolocation device 23 and receive information i11 indicating whether the geolocation gl is functional (the function illustrated as f21(ECU, 23, i11)).

Finally, if all the conditions C1 to C3 and, where appropriate, C4 and/or C5 are met, the electronic control unit ECU is configured to activate said cleaning device 21 to begin a cleaning cycle Cy (the function illustrated as f4(ECU, 21, C, Cy)).

Thus, when activated, the cleaning device 21 executes the cleaning cycle Cy (the function f5 described previously).

It will be noted that the information i1 to i11 is transmitted via the vehicle network. In nonlimiting examples, the vehicle network is a CAN or LIN.

It will be noted that the cleaning system Sys may comprise one or more computer program products Pg comprising one or more sequences of instructions that can be executed by said electronic control unit ECU, the execution of said sequences of instructions allowing implementation of steps E1, E2, E3 and E4, and where applicable E3' and E3" of the cleaning method 1 described.

Such a computer program Pg may be written in a writable nonvolatile memory of the ROM type or in a rewritable non-volatile memory of the EEPROM or flash type. Said computer program Pg can be written to the memory at factory or else loaded into the memory or downloaded into the memory remotely. The sequences of instructions may be sequences in machine code, or else sequences in a control language which are interpreted by the electronic control unit at the moment of executing them. In the nonlimiting example of FIG. 3, a computer program Pg is written to a memory 34 of the cleaning system Sys.

Thus, the cleaning system Sys comprises at least one memory 34 which is coupled to said electronic control unit ECU. The memory 34 is a computer readable permanent storage medium containing instructions which, when executed by a computer, causes the computer to execute steps E1, E2, E3 and E4, and where applicable E3' and E3" of said cleaning method 1.

Of course, the description of the invention is not limited to the embodiments described above and to the field described above. Thus, in another nonlimiting embodiment, the cleaning method 1 may also be applied to lateral glazed surfaces 20 of the side windows of the vehicle 2. Thus, in another nonlimiting embodiment, the cleaning method 1 may be applied to a glazed surface 20 of the rear screen of the vehicle 2. Thus, when verifying the fifth condition C5, in a nonlimiting third embodiment variant, the detection of the brightness lx can be combined with a determination of two timespans, day and night (which vary according to the season). If the brightness lx is below the brightness threshold and if the current time falls within the daytime timespan, that means that it is daytime, but that it is possible that the motor vehicle 2 is in an underground car park without lighting or in a garage without lighting. The cleaning cycle Cy is therefore not begun. If the brightness lx is below the brightness threshold and if the current time falls within the night-time timespan, that means that it is night-time, but that it is possible that the motor vehicle 2 is in an underground car park without lighting or in a garage without lighting. The cleaning cycle Cy is therefore not begun. In order to decide to begin the cleaning cycle Cy, in this third nonlimiting embodiment variant, it is possible to use in combination the test on the geolocation gl being functional.

Thus, the invention described has the following advantages in particular:
  it makes it possible to verify the conditions in which the cleaning device 21 can be activated automatically without the manual intervention of any individual person, by beginning automatic cleaning of the glazed surface 20
  it optimizes the consumption of the liquid Lq used for cleaning. Specifically, the cleaning is performed at just the right moment without waiting several days before cleaning off insect strike is. If cleaning is delayed for too long, this leads to a very significant consumption of liquid Lq and a large sized storage tank 214 has to be envisioned. Thus, thanks to the automating of the cleaning, the size and also the weight of the storage tank 214 in the motor vehicle 2 are reduced.
  it is simple to implement.

The invention claimed is:

1. A cleaning method for cleaning a glazed surface of a vehicle, said vehicle comprising an electronic control device (ECU) and a cleaning device comprising a wiping system with at least one spray device for spraying a liquid, the cleaning method comprising: verifying, by the ECU, a first condition that a current season is spring or summer, wherein the current season is determined by an internal clock of the vehicle and a geolocation device; verifying, by the ECU, a second condition which is a probability of there being an insect strike on said glazed surface, wherein the probability is determined by at least one of a speedometer of the vehicle and the geolocation device; verifying, by the ECU, a third condition that said vehicle is stopped, wherein a vehicle stop is determined by the speedometer of the vehicle; verifying, by the ECU, a fourth condition that the insect strike has dirtied the glazed surface such as to impair visibility for a driver of the vehicle, wherein verifying that the insect strike has dirtied the glazed surface is determined by an insect-strike measurement device configured to detect a number of insect strikes, wherein the insect-strike measurement device is an accelerometer; activating, by the ECU, said cleaning device in order to begin a cleaning cycle, wherein the cleaning device is activated based on a positive verification of the first condition, the second condition, the third condition, and the fourth condition; and executing, by the cleaning device, said cleaning cycle, wherein the cleaning cycle comprises spraying the liquid onto the glazed surface using the at least one spray device and wiping the glazed surface using the wiping system.

2. The cleaning method according to claim 1, wherein verifying the current season is performed using a current date and a hemisphere in which said vehicle is located.

3. The cleaning method according to claim 1, wherein verifying the probability of there being the insect strike on said glazed surface is based on a speed of said vehicle being above a primary threshold.

4. The cleaning method according to claim 3, wherein said primary threshold is equal to 70 km/h.

5. The cleaning method according to claim 1, wherein verifying the probability of there being the insect strike on said glazed surface is based on a geolocation of said vehicle being outside a built-up urban area.

6. The cleaning method according to claim 1, whereby verifying that the insect strike has dirtied said glazed surface is further based on:
  a running time of said vehicle above a secondary threshold, wherein the running time is determined by a running-time meter of the vehicle.

7. The cleaning method according to claim 6, whereby said secondary threshold is equal to three hours.

8. The cleaning method according to claim 1, further comprising:
  verifying, by the ECU, a fifth condition that said vehicle is outdoors, wherein the vehicle being outdoors is determined by one or more of a fuel filler flap sensor, a presence sensor, a rain-brightness sensor, and the geolocation device.

9. The cleaning method according to claim 1, wherein verifying that the insect strike has dirtied the glazed surface is further based on the number of insect strikes being above a tertiary threshold.

10. The cleaning method according to claim 9, wherein the tertiary threshold is equal to 15.

11. The cleaning method according to claim 1, wherein the accelerometer is disposed on the wiping system.

12. The cleaning method according to claim 1, wherein the accelerometer is disposed on the glazed surface.

* * * * *